(12) United States Patent
Pizio

(10) Patent No.: US 11,789,552 B1
(45) Date of Patent: Oct. 17, 2023

(54) COMPUTER MOUSE WRIST SUPPORT SYSTEM

(71) Applicant: Dennis Pizio, Jupiter, FL (US)

(72) Inventor: Dennis Pizio, Jupiter, FL (US)

( * ) Notice: Subject to any disclaimer, the term of this patent is extended or adjusted under 35 U.S.C. 154(b) by 44 days.

(21) Appl. No.: 17/378,449

(22) Filed: Jul. 16, 2021

(51) Int. Cl.
*G06F 3/039* (2013.01)

(52) U.S. Cl.
CPC .................................. *G06F 3/039* (2013.01)

(58) Field of Classification Search
None
See application file for complete search history.

(56) References Cited

U.S. PATENT DOCUMENTS

| | | | |
|---|---|---|---|
| 5,913,497 A | 6/1999 | Myers | |
| 6,396,478 B1 | 5/2002 | Kravtin et al. | |
| 6,616,108 B1 | 9/2003 | Brophy et al. | |
| 6,828,958 B2 | 12/2004 | Davenport | |
| 6,932,304 B1 | 8/2005 | Villamar | |
| 8,451,225 B2 | 5/2013 | Loomis | |
| 2002/0162920 A1 | 11/2002 | Cruzet | |
| 2005/0121562 A1 | 6/2005 | Baumgardner | |
| 2007/0252050 A1 | 11/2007 | Kennedy | |
| 2017/0010683 A1* | 1/2017 | Pizio | ........................ G06F 3/039 |
| 2020/0209989 A1* | 7/2020 | Lu | ...................... G06F 3/03543 |

FOREIGN PATENT DOCUMENTS

| | | | |
|---|---|---|---|
| CN | 201489472 U | * | 5/2010 |
| CN | 204515712 U | * | 7/2015 |
| CN | 107748629 A | * | 3/2018 |
| CN | 213182695 U | * | 5/2021 |

* cited by examiner

*Primary Examiner* — Xuyang Xia
(74) *Attorney, Agent, or Firm* — The Patent Professor; John Rizvi

(57) ABSTRACT

A computer mouse assembly having a slidable user wrist support controllably extendable upwardly and selectively set to a user-defined height above a main mouse body to support the wrist of a user during use of the mouse.

15 Claims, 8 Drawing Sheets

COMPUTER MOUSE WRIST SUPPORT SYSTEM

FIELD OF THE INVENTION

The present invention relates to an apparatus configured for use with a computer mouse to cause a user's hand and wrist to be in ergonomically correct positions relative to each other during use of the mouse, while providing positional adjustment of a distal palmar hand portion support to facilitate use by individuals having a wide range of hand sizes.

BACKGROUND OF THE INVENTION

Computer-induced health problems can be an umbrella term for various problems a computer user can develop from prolonged and incorrect computer use. The health problems that can arise from using computers can be generally defined as the many a computer user may experience from using computers extensively over a prolonged period of time in an inefficient manner. The inefficiency being that the computer user may have poor etiquette when using peripherals, such as a computer mouse. The medical problem associated with computer-related work is carpal tunnel syndrome (CTS), a stress-related injury caused by repetitive movement of joints, especially the wrist, and can lead to numerous musculoskeletal problems. Carpal tunnel syndrome is a condition in which there is excessive pressure on the median nerve. This is the nerve in the wrist that allows feeling and movement to parts of the hand. Carpal tunnel syndrome can lead to numbness, tingling, weakness, or muscle damage in the hands and fingers.

Ideally, an ergonomically correct position for a user at a computer workstation has the wrist of the hand controlling the mouse in a neutral position, with no bending, the hand being relaxed and in straight alignment with the associated forearm. In operation, there should be no bending of the user's wrist and fingers should fall naturally downward over the controls of the mouse. The user should be able to move the mouse with a full arm movement, keeping the wrist straight and in line with a full arm movement, keeping the wrist straight and in line with his or her shoulder. In order to reduce and minimize repetitive motion injuries (RMI) for computer users, a palm support is often placed in front of the mouse to provide support for the palm of the hand during brief pauses. A good technical description of the problems confronting users of computer mice is set out in U.S. Pat. No. 5,414,445 to Kaneko et al., issued May 9, 1995.

Many solutions have been proposed for providing a hand positioning device for a computer mouse, which are selectively attachable to the mouse and include a raised area to facilitate proper positioning of the user's hand to minimize carpal tunnel and other related injuries. However, a major limitation of these devices is that they do not provide an efficient means for enabling a user of the apparatus to adjust both the distance of the support from the mouse and the relative height of the support from an upper surface of the mouse.

Accordingly, there remains a need in the art for an innovation that will overcome the deficiencies of past approaches and the problems that remain unsolved.

SUMMARY OF THE INVENTION

The present disclosure is generally directed to a computer mouse assembly having a wrist supporting subassembly and having a wrist supporting pad to cause a user's hand and mist to be in an ergonomically correct position during the use of the mouse, while providing a positional adjustment of a distal palmar hand support to facilitate use by individuals having a wide variety of hand sizes.

In a first implementation of the invention, a computer mouse assembly may comprise a computer mouse body. The computer mouse body may have a top area, and a pair of slotted openings extending through the top area. A pair of adjustment guides may extend downwardly from a lower surface of the top area. Each slotted opening may be communicated with a respective interior of each adjustment guide. The computer mouse assembly may further include a user wrist support subassembly assembled to the computer mouse body. The user wrist support subassembly may comprise a wrist support platform and a wrist support platform pad disposed upon the wrist support platform for supporting a wrist portion of a hand of an individual during use of the mouse. A pair of support members may be integrally formed with, and may extend downwardly from the wrist support platform. Each support member may extend through a respective one of the slotted openings and into the interior of a respective adjustment guide of the pair of adjustment guides. Each support member may include a longitudinally-extending slot therethrough and defined by a perimeter edge in the form of a contiguous series of excised steps. The computer mouse assembly may further include an attachment hardware subassembly for securing the user wrist support subassembly to the computer mouse body along a series of different heights corresponding to selective engagement between the attachment hardware subassembly and each excised step of the series of excised steps. Additionally, the computer mouse assembly may comprise at least one compression spring may be configured to exert an upward force on the user wrist support subassembly to raise the user wrist support subassembly with respect to the computer mouse body when selective vertical positioning is enabled by the attachment hardware subassembly.

In a second aspect, each compression spring of said at least one compression spring may extend through a circular portion of one of the slotted openings.

In another aspect, each compression spring of said at least one compression spring may extend between a respective support member of the pair of support members and a floor of the interior of the adjustment guide into which the respective support member extends.

In another aspect, each compression spring of said at least one compression spring may be configured to exert an upward force on a seat formed in the respective support member. In some embodiments, the seat may be circular.

In another aspect, the seat may be provided at a longitudinal edge of the respective support member.

In yet another aspect, the respective support member may include a recessed bottom portion forming a recess which receives said each compression spring.

In another aspect, the respective support member may include a disc at a longitudinal edge of the respective support member. An underside of the disc may provide the seat.

In another aspect, said at least one compression spring may be configured such that the upward force is overcomeable by the weight of a human hand resting on the mist support platform pad.

In another aspect, the at least one compression spring may include a pair of compression springs. Each compression spring of the pair of compression springs may be configured to exert an upward force on a respective support member of the pair of support members with respect to the computer mouse body.

In yet another aspect, each compression spring of the pair of compression springs may extend through a circular portion of a respective slatted opening of the pair of slotted openings.

In another aspect, each compression spring of the pair of compression springs may extend between the respective support member and a floor of the interior of a respective adjustment guide of the pair of adjustment guides.

In another aspect, each compression spring of the pair of compression springs may be configured to exert an upward force on a seat formed in the respective support member. In some embodiments, the seat may be circular.

In another aspect, the seat may be provided at a longitudinal edge of the respective support member.

In yet another aspect, the respective support member may include a recessed bottom portion forming a recess which receives said each compression spring.

In another aspect, the respective support member may include a disc at a longitudinal edge of the respective support member, wherein an underside of the disc provides the seat.

In another aspect, the attachment hardware subassembly may extend through the computer mouse body along a left-to-right, transverse direction and may be translatable along the transverse direction to selectively engage and disengage the series of excised steps.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

Figure 1:
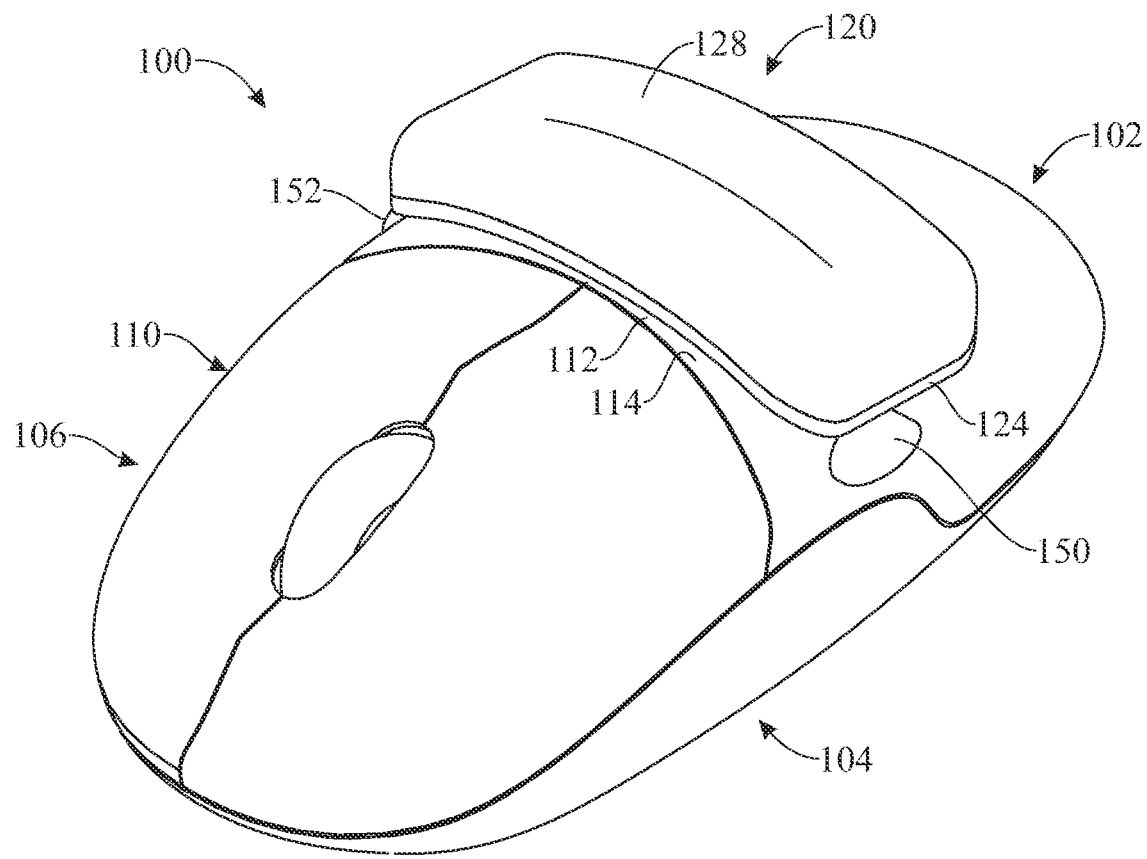
FIG. 1 presents a top front perspective view of a computer mouse assembly in accordance with a first exemplary implementation of the invention.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Referring now to accompanying FIGS. 1-7, in an exemplary implementation of the present invention, a computer mouse assembly 100 with an adjustable user wrist support is provided. The computer mouse assembly 100 may be wireless or wired. The computer mouse assembly 100 of the present disclosure includes a mouse body 110 and a user wrist support subassembly 120 configured to provide a support for the hand or wrist of the user of the computer mouse assembly 100, wherein the support for the hand or wrist is adjustable relative to the mouse body 110.

The wrist support subassembly 120 includes a wrist support platform 124 and a wrist support platform pad 128, readily adhered or affixed to an exterior surface of the wrist support platform 124. The wrist support platform 124 may be affixed to and carried by a pair of support members 130, 132. In some embodiments, the support members 130, 132 may be integrally molded with the wrist support platform 124 forming a unitary structure. The wrist support platform 124 and support members 130 and 132 are extendable and contractable from a top area of the mouse body 110.

For example, the mouse body 110 may include a top 112, from which the wrist support platform 124 and support members 130 and 132 may be selectively extended and contracted. The top 112 may include a top cover or wall 114, which may be concave or present other, preferably ergonomic shapes. The top 112 may include a pair of apertures 136, 138, which may be formed at the top wall 114 and may be oriented generally sideways, and preferably opposite to one another along a left-to-right, transverse direction. The top 112 may further comprise a pair of slots 140 and 142, which may be formed at the top wall 114 and may be oriented generally upward. A pair of elongated adjustment guides 146, 148 may extend from an underside of the top wall 114 and generally downward and oppositely to the slots 140, 142. The adjustment guides 146, 148 may be hollow and define an interior space in communication with the respective slot 140, 142, Each support member 130, 132 is slidably movable inward and outward within a respective one of the adjustment guides 146, 148 and through the corresponding slot 140, 142.

Figure 3A:
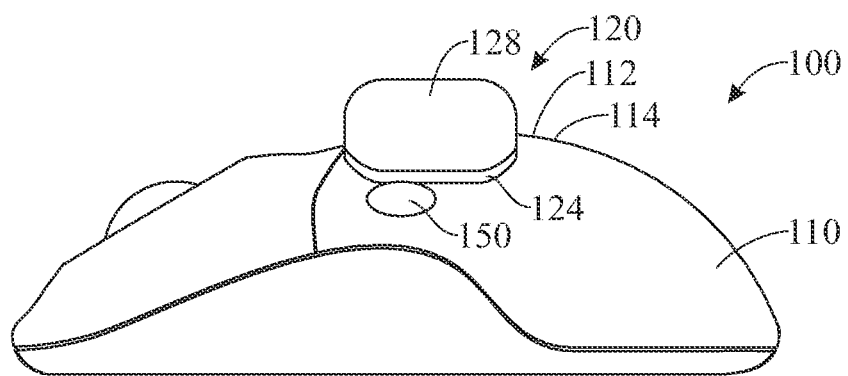
FIG. 3A presents a left side elevation view of the of the computer mouse assembly of FIG. 1, wherein the height adjusting pad is shown in a lowest position.
Figure 3B:
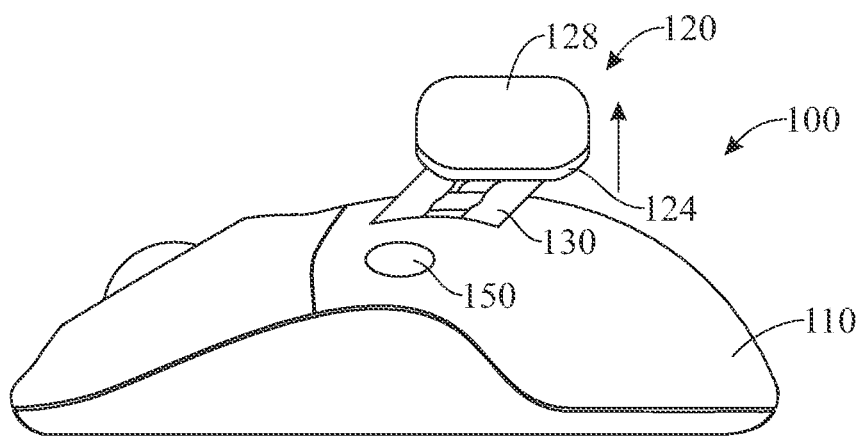
FIG. 3B presents a left side elevation view of the computer mouse assembly of FIG. 1, wherein the height adjusting pad is shown in a mid-level position.
Figure 3C:
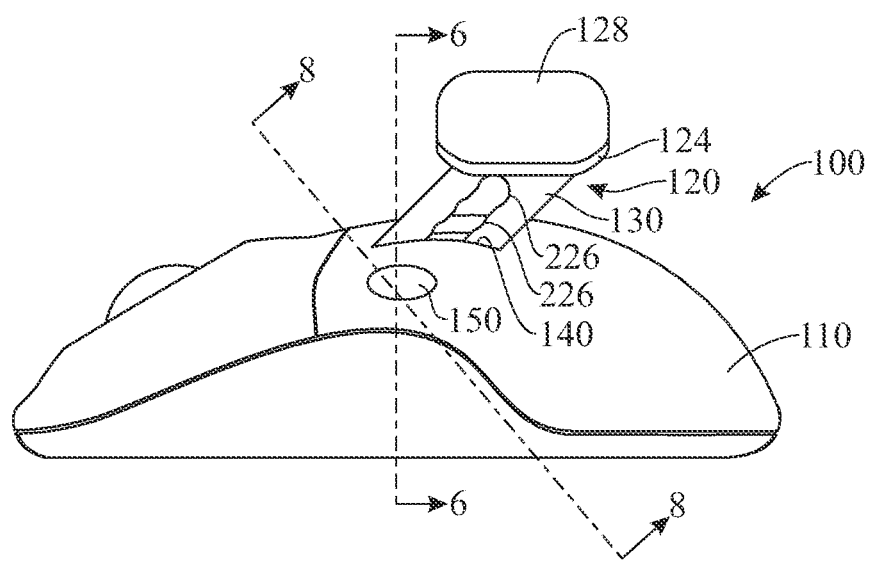
FIG. 3C presents a left side elevation view of the computer mouse assembly of FIG. 1, wherein the height adjusting pad is shown in a highest position.
Figure 4:
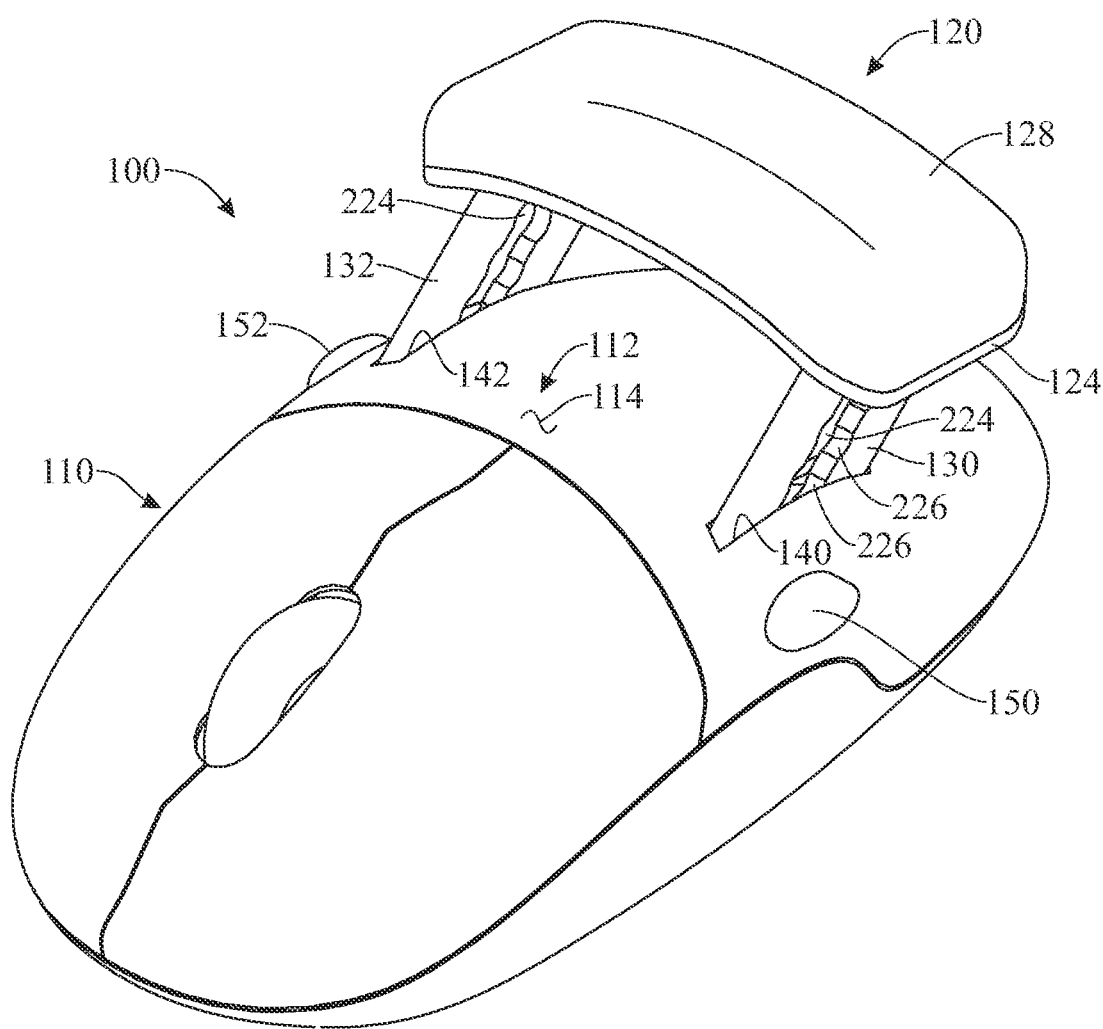
FIG. 4 presents a top front perspective view of the computer mouse assembly in the position of FIG. 3C.
Figure 5:
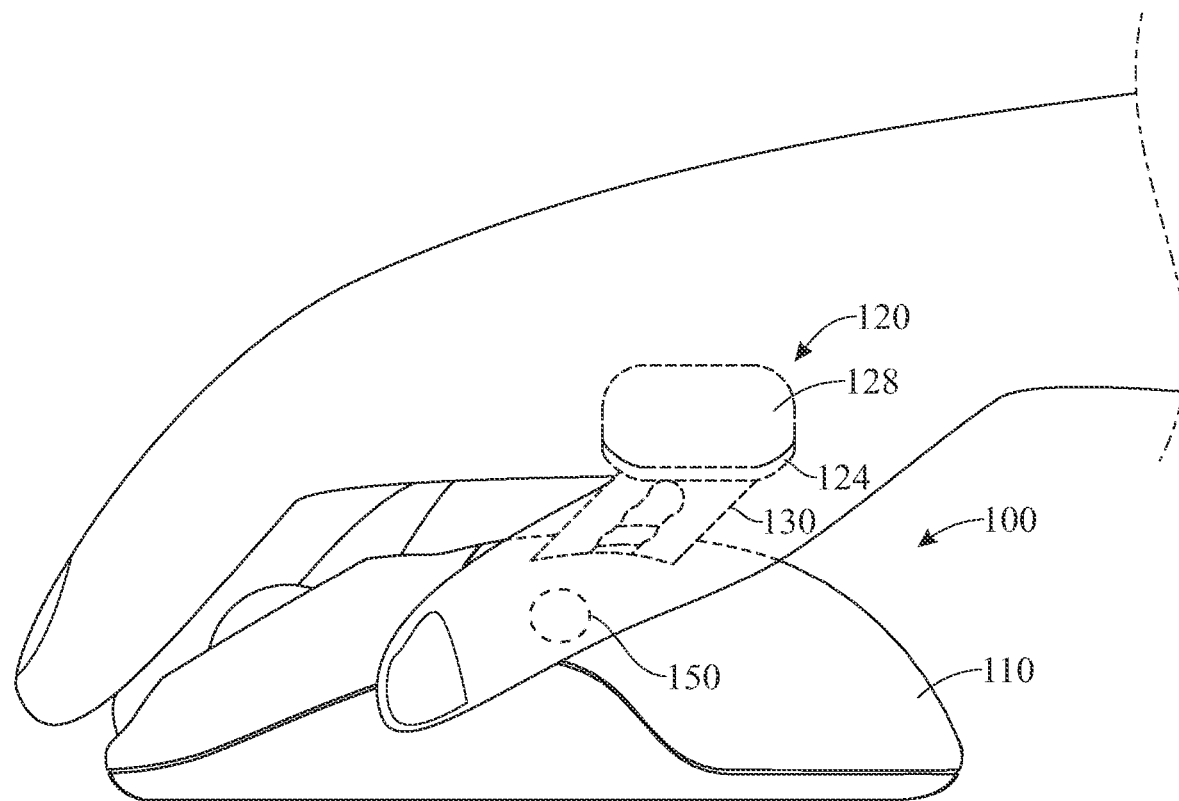
FIG. 5 presents a side elevation view of a user's hand resting on the computer mouse assembly in the position of FIG. 3C.

Preferably, the user wrist support subassembly is located near a rear end 102 of the computer mouse assembly 100 spanning from a right side 104 to a left side 106 of the computer mouse assembly 100. To the right side 104 and left side 106 of the computer mouse assembly 100, respectively, are a pair of outwardly extending projections or actuators, including a tight side actuator 150 and a left side actuator 152, which extend outwardly from adjacent surfaces of the mouse to provide a tactile protrusion which can be pressed inward by the user, as will be described hereafter. The pair of actuators 150 and 152 are selectively engageable by the user to operate the wrist support subassembly 120 and adjust the height of the wrist support subassembly 120 of the computer mouse assembly 100 relative to the mouse body 110, For instance and without limitation, the wrist support subassembly 120 may be selectively and reversibly adjusted to a lower position or minimum height shown in FIG. 3A, one or more intermediate positions, an example of which is shown in FIG. 3B, and an upper position or maximum height, as shown in FIG. 3C.

Figure 2:
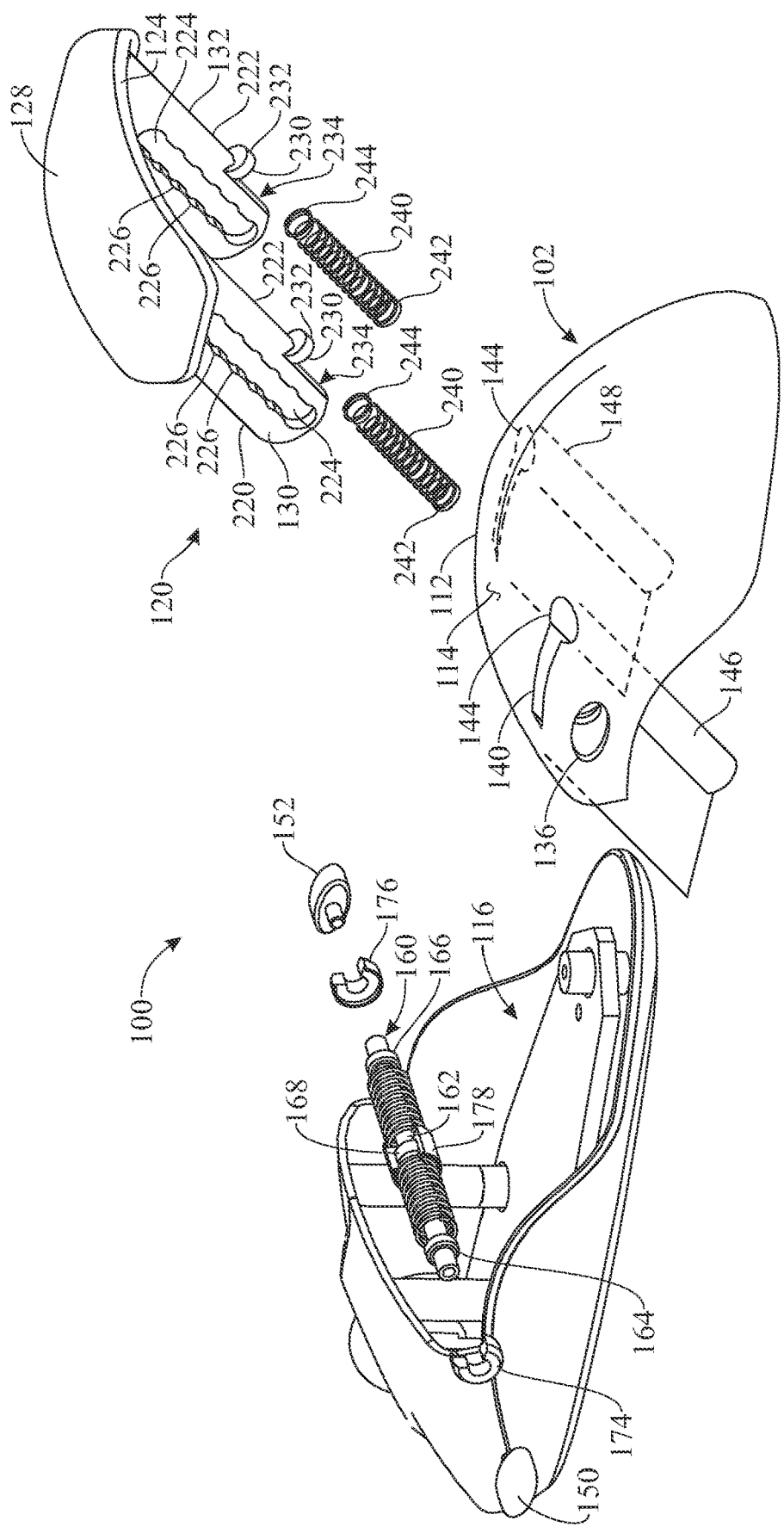
FIG. 2 presents an exploded, top rear perspective view of the computer mouse assembly of FIG. 1.
Figure 6:
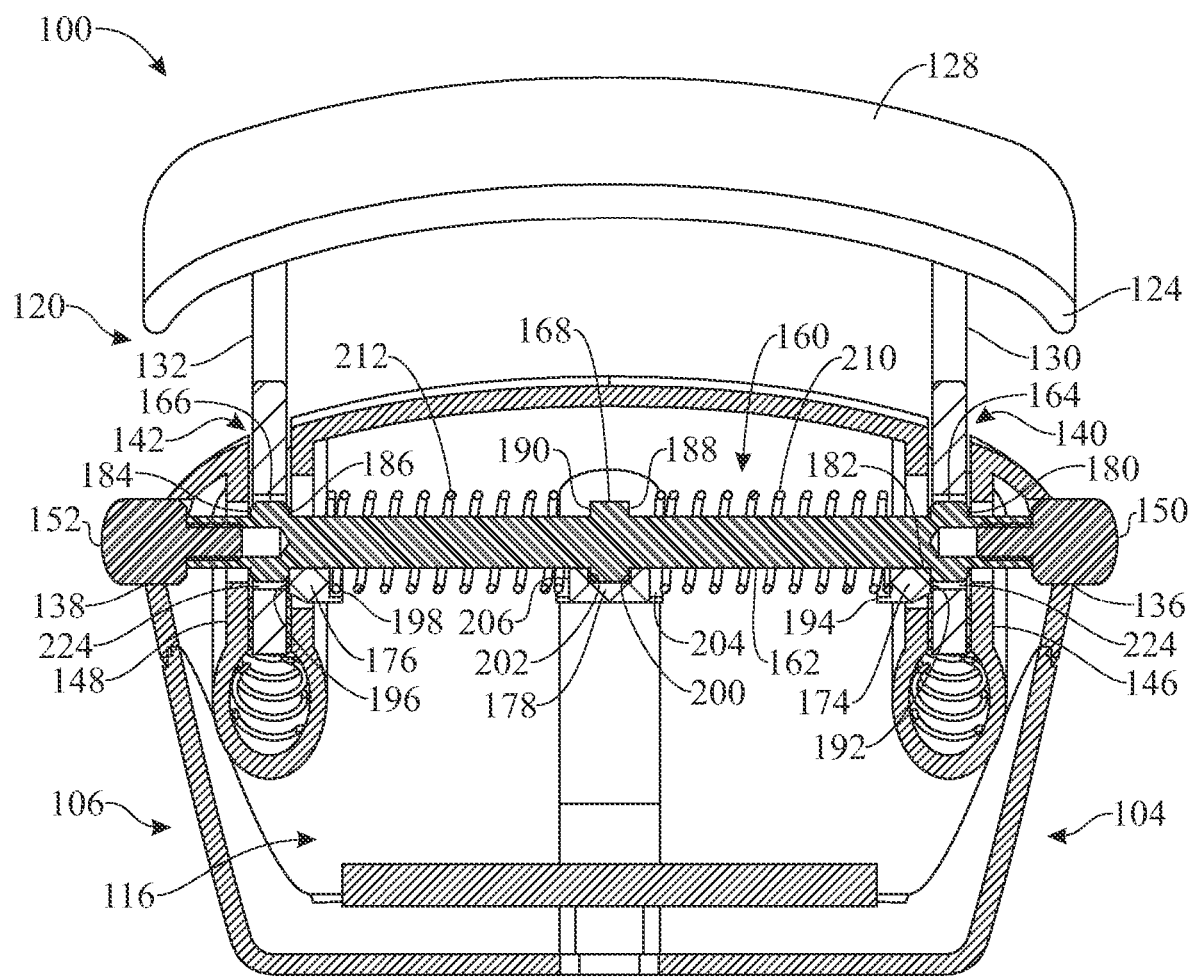
FIG. 6 presents a cross-sectional front elevation view of the computer mouse assembly, the section take along section plane 6-6 indicated in FIG. 3C, the computer mouse assembly shown in a locked position.

As best shown in FIGS. 2 and 6, the actuators 150 and 152 are integrally conjoined to a linear adjustment shaft 160. For instance, in some embodiments, the actuators 150 and 152 may be integrally formed with the linear adjustment shaft 160. In other embodiments, such as the present embodiment, one or more of the actuators 150 and 152 may be disconnectably connected to the linear adjustment shaft 160, which may facilitate assembly and repair of the computer mouse assembly 100. For example, in some embodiments such as the present embodiment, each actuator 150, 152 may be threaded to a respective end of the linear adjustment shaft 160. The depicted embodiment, more specifically, is such that each actuator 150 and 152 comprises a male thread which threads into a female thread provided at said respective end of the linear adjustment shaft 160, as best shown in FIG. 6, which may contribute to reduce the size of the actuators 150 and 152.

With continued reference to FIGS. 2 and 6, the mouse body 110 may define an internal space or cavity 116. The cavity 116 may store one or more batteries (not shown). The linear adjustment shaft 160 may be arranged within and may extend across the cavity 116 in a left-to-right, transverse direction. The linear adjustment shaft 160 may include a rod 162 having a plurality of, and preferably three, radially protruding flanges 164, 166, and 168. The flanges 164, 166, and 168 are spaced apart along the rod 162, with a first flange 164 corresponding with support member 130, a second flange 166 corresponding with support member 132, and a third flange 168 arranged between the first and second flanges 164 and 166, and preferably centrally within the rod 162 and equidistant from the first and second flanges 164 and 166, The flanges 164, 166, and 168 are integrally formed with or otherwise affixed to the rod 162, such that the flanges 164, 166, 168 and the rod 162 are jointly movable in the left-to-right, transverse direction, for purposes that will be described hereinafter. The wrist support subassembly 120 may further include a plurality of clips, and more preferably three clips, i.e. a first clip 174, a second clip 176 and a third clip 178, clipped onto the rod 162 at the first, second and third flanges 164, 166 and 168, respectively.

The first flange 164 comprises an outer side 180 and an opposite, inner side 182. Similarly, the second flange 166 includes an outer side 184 and an opposite, inner side 186, The third flange 168 includes a right side 188 and an opposite, left side 190. In turn, the first clip 174 includes an outer side 192 and an opposite, inner side 194. Similarly, the second clip 176 includes an outer side 196 and an opposite, inner side 198. In turn, the third clip 178 has an inner leftward surface 200 and an inner rightward surface 202 arranged in spaced-apart relationship with one another, with the third clip 178 housed therebetween, and further includes an outer rightward surface 204 and an outer leftward surface 206 formed oppositely to the inner leftward surface 200 and the inner rightward surface 202, respectively, A first compression spring 210 may extend between the first clip 174 and the third clip 178, and more specifically, between the inner side 182 of the first clip 174 and the outer rightward surface 204 of the third clip 178. A second compression spring 212 may extend between the second clip 176 and the third clip 178, and more specifically, between the inner side 198 of the second clip 176 and the outer leftward surface 206 of the third clip 178.

As shown in FIG. 2, the wrist support platform 124 and the support members 130, 132 may form an inverted U-shaped configuration, with the support members 130 and 132 arranged in spaced apart relationship with one another and extending downward from the wrist support platform 124. The support members 130, 132 may be elongate and generally planar. In some embodiments, the support members 130 and 132 may be generally parallel to one another, Each support member 130, 132 may include a front edge or side 220 and a rear edge or side 222. Between the front and rear sides 220 and 222, each support member 130, 132 may include a respective slot 224 formed through the support member 130, 132. The slot 224 may be arranged along a direction which is generally parallel to the front and rear edges 220 and 222 of the slot 224, with the slots 224 parallel to one another. Each slot 224 comprises a length of consecutive, excised steps 226. These excised steps 226 provide corresponding stops to the wrist support subassembly 120 at respective, different heights relative to the mouse body 110 when raising or lowering the wrist support subassembly 120 relative to the mouse body 110, allowing the user to change the height of the wrist support platform pad 128 at discrete intervals, each interval (or corresponding excised step 226) corresponding to a respective height of the wrist support subassembly 120. In this way, the user may select the desired height among the available discrete height intervals or increments, as needed for ultimate comfort.

With continued reference to FIG. 2, each support member 130, 132 may further include a seating surface or seat 230 which is oriented non-parallel to the slots 224, i.e. to a longitudinal direction along which the slots 224 are formed (which corresponds to the direction of displacement of the wrist support subassembly 1:20) and preferably perpendicular to the slots 224. In some embodiments, the seat 230 may be provided by a stop platform 232 comprised along one of the front and rear sides 220, 222. In the non-limiting example shown in the drawings, each stop platform 232 is formed as a circular disc or plate at the rear side 222 of the respective support member 130, 132. In some embodiments, the seat 230 may be located at a longitudinal cutout or recess 234 formed in said one of the front and rear sides 220, 222 at which the seat 230 is provided. The recess 234 may extend from the seat 230 to a bottom end of the support member 130, 132.

As further shown in FIG. 2, a respective compression spring 240 may be provided at each support member 130, 132. Each compression spring 240 has a first or bottom end 242 and a second or top end 244. Each compression spring 240 may be at least partially received within the recess 234 of the corresponding support member 130, 132. As shown in FIGS. 2 and 6, the top end 244 of each compression spring 240 may rest and abut against the seat 230 of the corresponding support member 130, 132. Each spring 240 may extend through the circular slot portion 144 of a respective slot 140, 142, and the bottom end 242 of each compression spring 240 may be arranged inside the mouse body 110 and may abut against a respective inner bottom wall or floor 246 (FIG. 6) of each adjustment guide 144, 146. Each slot 140, 142 may further include an elongated slot portion 143 extending from the corresponding circular slot portion 144, wherein each elongated slot portion 143 is shaped and sized to receive, and generally conform, to a corresponding one of the support members 130, 132.

With reference to FIG. 6, the computer mouse assembly 100 is configured to adopt a locked position in which the wrist support subassembly 120 is prevented from being raised or lowered, and is thereby maintained in place at a selected vertical position or height relative to the mouse body 110. In the locked position, shown in the figure, the first clip 174 is movable transversely leftward, i.e. towards the left side 106, but is prevented from moving transversely rightward, i.e. towards the right side 104, by the support member 130. Conversely, the second clip 176 is movable transversely rightward, i.e. towards the right side 104, but is prevented from moving transversely leftward, i.e. towards the left side 106, by the support member 132. The third clip 178, in turn, is movable transversely rightward and leftward. In this locked position, the right and left side actuators 150 and 152 protrude outwardly through the apertures 136 and 138, respectively. In the locked position, the first and second compression springs 210 and 212 push the first and second clips 174 and 176 outwardly and against the support members 130, 132, respectively, which, in turn, pushes the first and second flanges 164 and 166 located on the rod 162. This causes the first and second flanges 164 and 166 to rest inside a specific (and selected) excised step 226 of the series of excised steps 226 available along the slots 224, preventing the vertical translation of the support members 130 and 132 relative to the mouse body 110.

Figure 7:
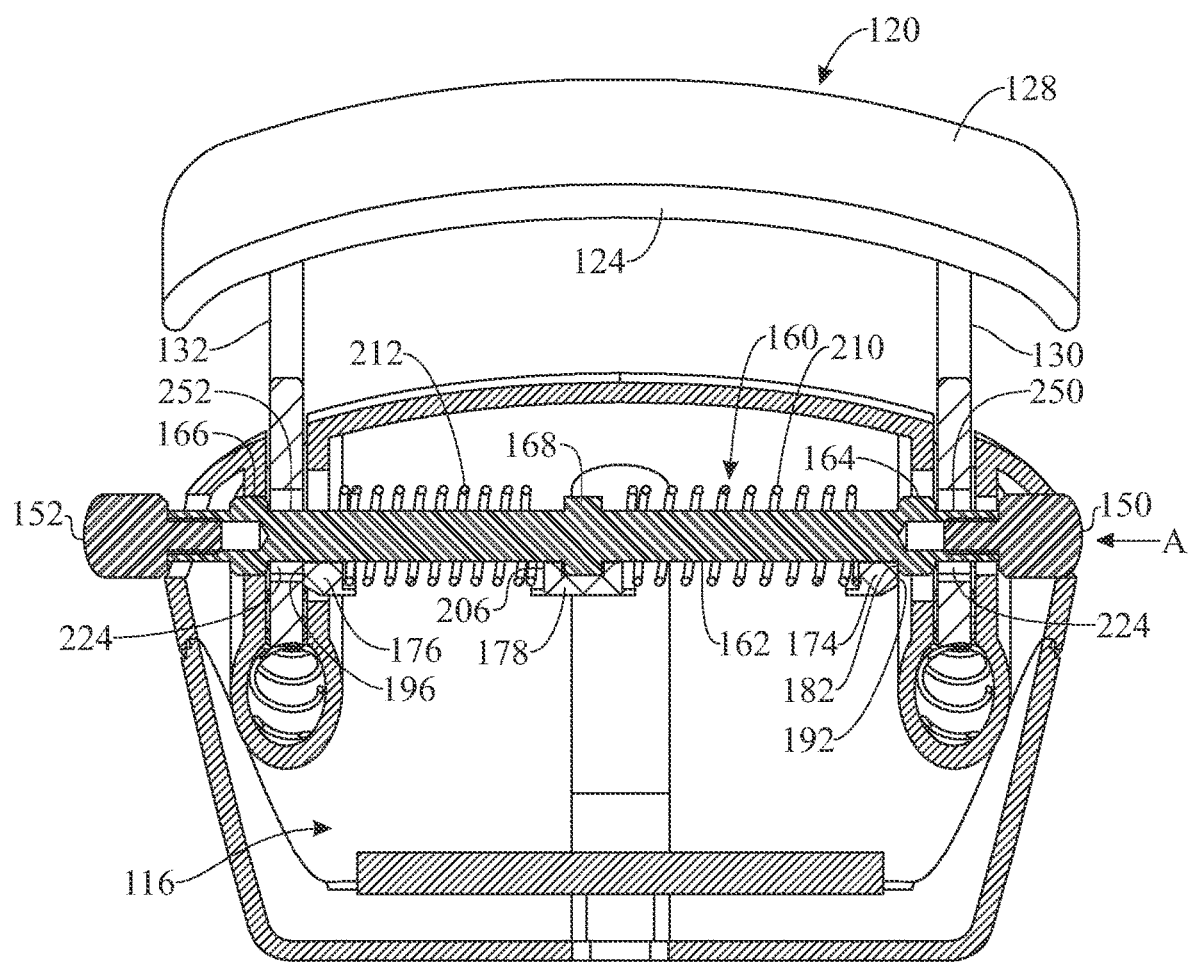
FIG. 7 presents a cross-sectional front elevation view of the computer mouse assembly, similar to FIG. 6, depicting the computer mouse assembly in an unlocked position.
Figure 8:
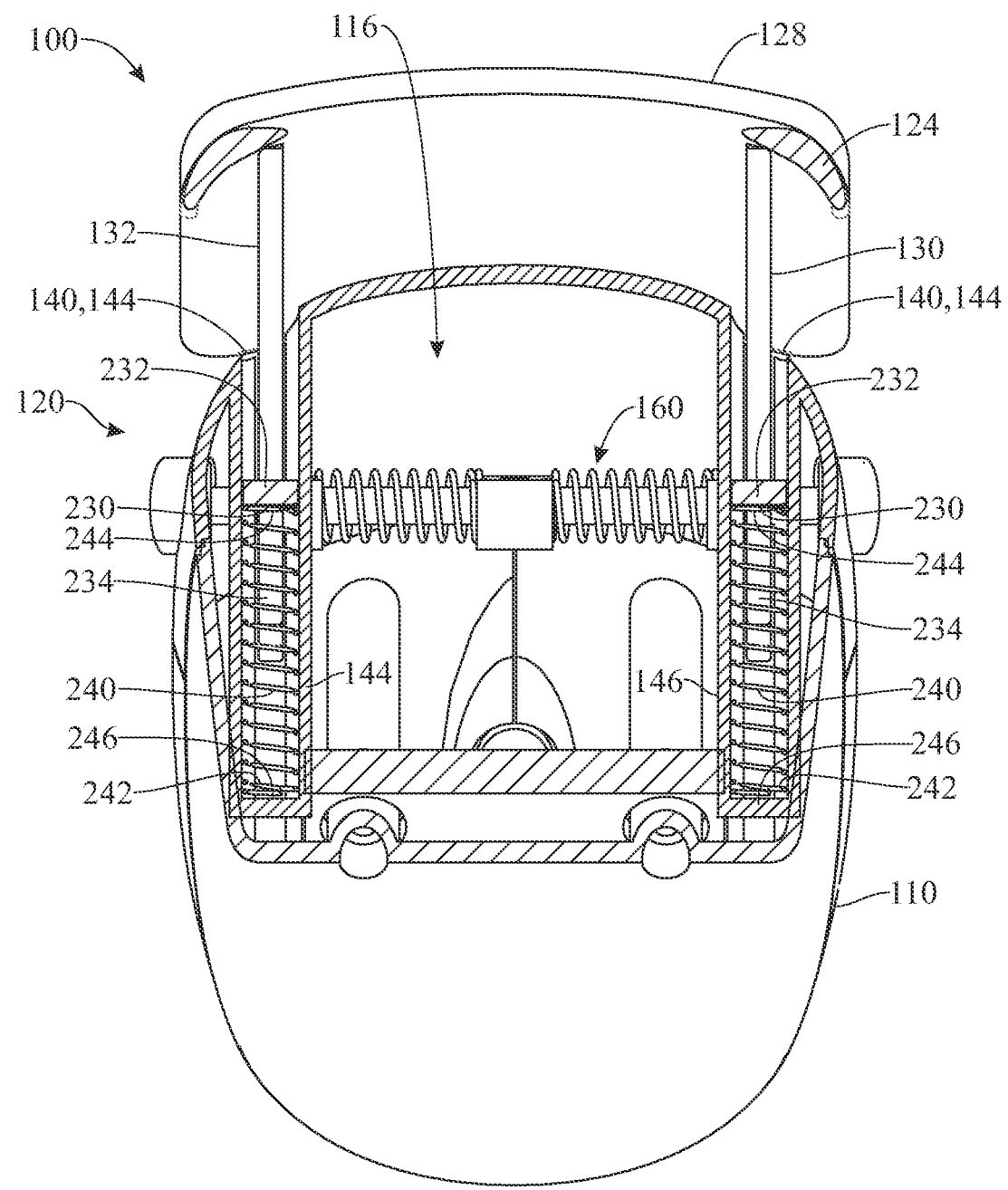
FIG. 8 presents a cross-sectional view of the computer mouse assembly of FIG. 3C, with the computer mouse assembly in the locked position and the section taken along section plane 8-8 indicated in FIG. 3C.

With reference to FIG. 7, a user may unlock the computer mouse assembly 100 to permit height adjustment of the wrist support subassembly 120 relative to the mouse body 110. For this purpose, the user may depress one of the two available actuators 150, 152 to cause the computer mouse assembly 100 to become unlocked. For instance, the present figure shows the computer mouse assembly 100 in a locked position caused by depressing the right side actuator 150, as indicated by arrow A. User depression of the right side actuator 150 inward, or leftward, as shown, causes the linear adjustment shaft 160 to shift or translate inward, and the left side actuator 152 to protrude further outwardly from the mouse body 110. The first, second and third flanges 164, 166 and 168 are shifted jointly with the linear adjustment shaft 160 and actuators 150, 152. The inner side 182 of the first flange 164 pushes the outer side 192 of the first clip 174 inward (leftward), causing the first clip 174 to move inward. The third clip 178 is carried leftward, in turn by the third flange 168. The second clip 176, however, is prevented from moving leftward by the support member 132. This causes the second compression spring 212 to further compress, relative to the locked position of FIG. 6, applying an increased, rightward force on the outer leftward surface 206 of the third clip 178. In this unlocked position, the first and second flanges 164 and 166 have been shifted out of the corresponding excised step 226 at each slot 224, and narrower sections 250, 252 of the rod 162 become housed or received within the slots 224. These narrower sections 250, 252 are narrower than the excised steps 226 and able to translate freely along the slots 224, thereby unlocking the slots 224, and thus the support members 130, 132 and associated wrist support platform 124, to move upward and downward relative to the linear adjustment shaft 160, which is vertically fixed relative to the mouse body 110.

With the computer mouse assembly 100 in the unlocked position of FIG. 7, the loaded compression springs 240 exert an upward force on the seats 230 and, therefore, on the support members 130, 132. In consequence, the support members 130, 132, wrist support platform 124 and wrist support platform pad 128 are spring-biased upward, against the weight of the user's hand which may be resting on the wrist support platform pad 128 during the height adjustment process. Such an upward spring-biasing of the compression springs 240 provides an extremely comfortable and intuitive height adjustment process. For instance, the user may intuitively allow the weight of his or her hand (while optionally exerting a slight downward force in dependence of the exact compression spring configuration) to shift the wrist support platform pad 128 downward, and the user may then alternatively, and easily, lift their hand slightly upward (or cease the slight downward force) to allow the wrist support platform pad 128 to be automatically raised by the compression springs 240, all said steps involving only a slight movement of the hand. For instance, in preferred embodiments, the adjustment can be carried out with the hand in the position of FIG. 5, by operating the left side actuator//150 with the thumb to unlock the device, and then carrying out minor adjustments in the position of the hand to allow the compression springs 240 to function and raise the wrist support platform pad 128, or instead counteract the compression springs 240 to lower the wrist support platform pad 128.

Once the user has readjusted the wrist support subassembly 120 to a desired height at which the user may rest their wrist or hand comfortably against the wrist support platform pad 128, the user may cease to press the right side actuator 150. In consequence, the spring-loaded second compression spring 212 pushes the third dip 178 rightward, which in turn pushes the third flange 168 and therefore the linear adjustment shaft 160 and first clip 174 rightward, back to the locked position of FIG. 6.

Though not shown herein, it is understood that alternative depression of the left side actuator 152 causes the computer mouse assembly 100 to work in similar fashion, and more specifically, symmetrically as to what was heretofore described with reference to the right side actuator 150.

In summary, the disclosed computer mouse assembly 100 provides an adjustable and easy-to-operate computer mouse solution which can be adapted to ergonomically fit different users or varying needs of a same user. As desired, the computer mouse assembly 100 can be translated about any surface as it rests on the base of the computer mouse assembly. The base of the mouse assembly can be comprised of already known parts, such as, optical sensors, fasteners, polytetrafluoroethylene (PTFE) pads, or the like. When utilizing the computer mouse assembly, a user may place his or her distal palm area or wrist on the wrist support platform pad 128. This may ergonomically improve a user hand position by aligning the user's palm with the respect to the positioning of the forearm. While in this ergonomic position the user is not prevented from utilizing their finger to operate the computer mouse scroll wheel, buttons or other user-operable controls which may be comprised in the computer mouse assembly 100.

Since many modifications, variations, and changes in detail can be made to the described preferred embodiments of the invention, it is intended that all matters in the foregoing description and shown in the accompanying drawings be interpreted as illustrative and not in a limiting sense. Furthermore, it is understood that any of the features presented in the embodiments may be integrated into any of the other embodiments unless explicitly stated otherwise. The scope of the invention should be determined by the appended claims and their legal equivalents.

What is claimed is:

1. A computer mouse assembly, comprising:
   a computer mouse body, having a top area, a pair of slotted openings extending through the top area, and a pair of adjustment guides extending downwardly from a lower surface of the top area, wherein each slotted opening is communicated with a respective interior of each adjustment guide;
   a user wrist support subassembly assembled to the computer mouse body, the user wrist support subassembly comprising:
      a wrist support platform,
      a wrist support platform pad disposed upon the wrist support platform for supporting a wrist portion of a hand of an individual during use of the mouse,
      a pair of support members integrally formed with and extending downwardly from the wrist support platform, wherein each support member extends through a respective one of the slotted openings and into the interior of a respective adjustment guide of the pair of adjustment guides, each support member having a longitudinally-extending slot therethrough and defined by a perimeter edge in the form of a contiguous series of excised steps;
   an attachment hardware subassembly for securing the user wrist support subassembly to the computer mouse body along a series of different heights corresponding to selective engagement between the attachment hardware subassembly and each excised step of the series of excised steps; and
   at least one compression spring configured to exert an upward force on the user wrist support subassembly to raise the user wrist support subassembly with respect to the computer mouse body when selective vertical positioning is enabled by the attachment hardware subassembly; wherein
   each compression spring of said at least one compression spring is configured to exert an upward force on a seat formed in the respective support member, wherein the seat is provided at a longitudinal edge of the respective support member; and further wherein
   the respective support member comprises a recessed bottom portion forming a recess which receives said each compression spring.

2. The computer mouse assembly of claim 1, wherein each compression spring of said at least one compression spring extends through a circular portion of one of the slotted openings.

3. The computer mouse assembly of claim 1, wherein each compression spring of said at least one compression spring extends between a respective support member of the pair of support members and a floor of the interior of the adjustment guide into which the respective support member extends.

4. The computer mouse assembly of claim 1, wherein the seat is circular.

5. The computer mouse assembly of claim 1, wherein the respective support member comprises a disc at a longitudinal edge of the respective support member, wherein an underside of the disc provides the seat.

6. The computer mouse assembly of claim 1, wherein said at least one compression spring is configured such that said upward force is overcomeable by the weight of a human hand resting on the wrist support platform pad.

7. The computer mouse assembly of claim 1, wherein the attachment hardware subassembly extends through the computer mouse body along a left-to-right, transverse direction and is translatable along said transverse direction to selectively engage and disengage the series of excised steps.

8. A computer mouse assembly, comprising:
   a computer mouse body, having a top area, a pair of slotted openings extending through the top area, and a pair of adjustment guides extending downwardly from a lower surface of the top area, wherein each slotted opening is communicated with a respective interior of each adjustment guide;
   a user wrist support subassembly assembled to the computer mouse body, the user wrist support subassembly comprising:
      a wrist support platform,
      a wrist support platform pad disposed upon the wrist support platform for supporting a wrist portion of a hand of an individual during use of the mouse,
      a pair of support members integrally formed with and extending downwardly from the wrist support platform, wherein each support member extends through a respective one of the slotted openings and into the interior of a respective adjustment guide of the pair of adjustment guides, each support member having a longitudinally-extending slot therethrough and defined by a perimeter edge in the form of a contiguous series of excised steps;
   an attachment hardware subassembly for securing the user wrist support subassembly to the computer mouse body along a series of different heights corresponding to selective engagement between the attachment hardware subassembly and each excised step of the series of excised steps; and
   at least one compression spring configured to exert an upward force on the user wrist support subassembly to raise the user wrist support subassembly with respect to the computer mouse body when selective vertical positioning is enabled by the attachment hardware subassembly; wherein
   each compression spring of said at least one compression spring is configured to exert an upward force on a seat formed in the respective support member; and further wherein
   the respective support member comprises a disc at a longitudinal edge of the respective support member, wherein an underside of the disc provides the seat.

9. A computer mouse assembly, comprising:
   a computer mouse body, having a top area, a pair of slotted openings extending through the top area, and a pair of adjustment guides extending downwardly from a lower surface of the top area, wherein each slotted opening is communicated with a respective interior of each adjustment guide;

a user wrist support subassembly assembled to the computer mouse body, the user wrist support subassembly comprising:
  a wrist support platform,
  a wrist support platform pad disposed upon the wrist support platform for supporting a wrist portion of a hand of an individual during use of the mouse,
  a pair of support members integrally formed with and extending downwardly from the wrist support platform, wherein each support member extends through a respective one of the slotted openings and into the interior of a respective adjustment guide of the pair of adjustment guides, each support member having a longitudinally-extending slot therethrough and defined by a perimeter edge in the form of a contiguous series of excised steps;
an attachment hardware subassembly for securing the user wrist support subassembly to the computer mouse body along a series of different heights corresponding to selective engagement between the attachment hardware subassembly and each excised step of the series of excised steps; and
a pair of compression springs, wherein each compression spring is configured to exert an upward force on a respective support member of the pair of support members of the user wrist support subassembly to raise the user wrist support subassembly with respect to the computer mouse body when selective vertical positioning is enabled by the attachment hardware subassembly; wherein
the seat is provided at a longitudinal edge of the respective support member; and further wherein
the respective support member comprises a recessed bottom portion forming a recess which receives said each compression spring.

10. The computer mouse assembly of claim 9, wherein each compression spring of the pair of compression springs extends through a circular portion of a respective slotted opening of the pair of slotted openings.

11. The computer mouse assembly of claim 9, wherein each compression spring of the pair of compression springs extends between the respective support member and a floor of the interior of a respective adjustment guide of the pair of adjustment guides.

12. The computer mouse assembly of claim 9, wherein each compression spring of the pair of compression springs is configured to exert an upward force on a seat formed in the respective support member.

13. The computer mouse assembly of claim 12, wherein the seat is circular.

14. The computer mouse assembly of claim 9, wherein the attachment hardware subassembly extends through the computer mouse body along a left-to-right, transverse direction and is translatable along said transverse direction to selectively engage and disengage the series of excised steps.

15. A computer mouse assembly, comprising:
  a computer mouse body, having a top area, a pair of slotted openings extending through the top area, and a pair of adjustment guides extending downwardly from a lower surface of the top area, wherein each slotted opening is communicated with a respective interior of each adjustment guide;
  a user wrist support subassembly assembled to the computer mouse body, the user wrist support subassembly comprising:
    a wrist support platform,
    a wrist support platform pad disposed upon the wrist support platform for supporting a wrist portion of a hand of an individual during use of the mouse,
    a pair of support members integrally formed with and extending downwardly from the wrist support platform, wherein each support member extends through a respective one of the slotted openings and into the interior of a respective adjustment guide of the pair of adjustment guides, each support member having a longitudinally-extending slot therethrough and defined by a perimeter edge in the form of a contiguous series of excised steps;
  an attachment hardware subassembly for securing the user wrist support subassembly to the computer mouse body along a series of different heights corresponding to selective engagement between the attachment hardware subassembly and each excised step of the series of excised steps; and
  a pair of compression springs, wherein each compression spring is configured to exert an upward force on a respective support member of the pair of support members of the user wrist support subassembly to raise the user wrist support subassembly with respect to the computer mouse body when selective vertical positioning is enabled by the attachment hardware subassembly; wherein
  the respective support member comprises a disc at a longitudinal edge of the respective support member, wherein an underside of the disc provides the seat.

* * * * *